United States Patent [19]

Thirlwall et al.

[11] 4,166,271
[45] Aug. 28, 1979

[54] DIGITAL RECOGNITION CIRCUITS

[75] Inventors: Alan C. Thirlwall; John G. S. Ive, both of Winchester, England

[73] Assignee: Independent Broadcasting Authority, London, England

[21] Appl. No.: 864,007

[22] Filed: Dec. 23, 1977

[30] Foreign Application Priority Data

Dec. 24, 1976 [GB] United Kingdom ............... 54164/76

[51] Int. Cl.² .................................................. G06F 7/02
[52] U.S. Cl. .................................. 340/146.2; 328/158; 358/148; 364/715
[58] Field of Search .................... 340/146.2, 146.1 AJ, 340/146.1 AB; 235/92 CA; 364/738, 423, 900, 715; 178/69.1; 328/156, 158; 358/148

[56] References Cited

U.S. PATENT DOCUMENTS

| | | | |
|---|---|---|---|
| 2,689,950 | 9/1954 | Bayliss et al. | 340/146.1 AJ |
| 2,944,248 | 7/1960 | Auerbach et al. | 340/146.1 AJ |
| 3,832,685 | 8/1974 | Hendrickson | 340/146.2 |
| 4,023,024 | 5/1977 | Bishop | 364/423 |

OTHER PUBLICATIONS

Design of Digital Computers, -Gschwind et al.; Springer-Verlag New York, Inc. 1975 pp, 47-52.

Primary Examiner—Errol A. Krass
Attorney, Agent, or Firm—Lawrence E. Laubscher

[57] ABSTRACT

A circuit for monitoring digital data in the form of words comprising a plurality of digits comprises a shift register through which the digital data is fed and one or more memory devices arranged to compare the data in the shift register with predetermined data stored in the memory device or devices. The memory device or devices produce a numerical count of the number of digits either which are correct or which are incorrect and that number is compared by a comparison circuit with a reference value in order to control dumping or further processing of the data.

3 Claims, 1 Drawing Figure

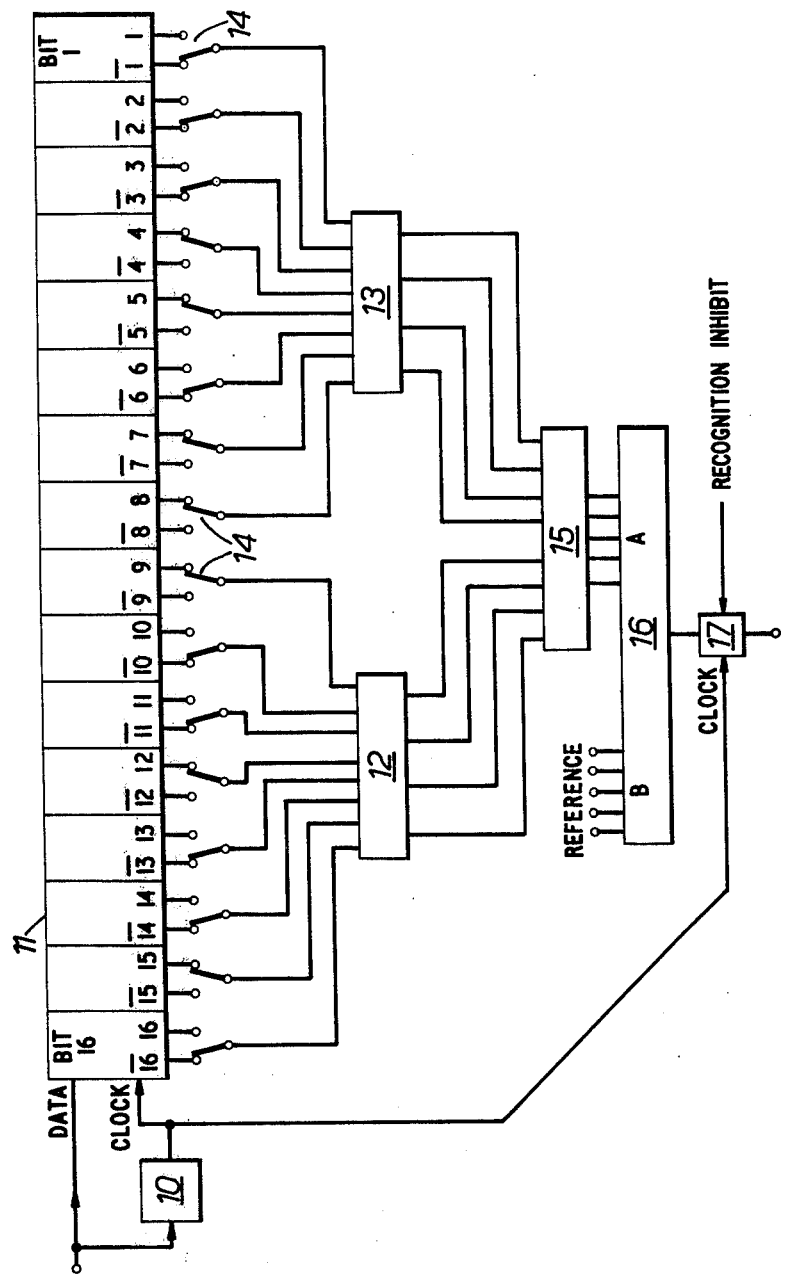

DIGITAL RECOGNITION CIRCUITS

BRIEF DESCRIPTION OF THE PRIOR ART

The present invention relates to digital communications and more particularly, but not exclusively, to apparatus for detecting a particular sequence of digits and for detecting errors in the digits.

In digital communications which is meant to include digital recording and/or reproduction as well as digital transmission, information is transmitted in the form or words which consist of a number, often 4 or 8 of bits. The words are transmitted in series, and it is possible that due to errors in transmission or reception the whole of each word may not be received. Unless the reception or reproduction equipment can recognize errors and is given a reference from which to start, the information can become completely garbled.

SUMMARY OF THE INVENTION

The present invention provides apparatus for monitoring digital words made up from a plurality of digits comprising storage means for storing the digits of digital words, recognition means connected to said storage means for producing an output signal indicative of the number of correct digits stored, and comparison means for comparing said output signal with a reference signal and producing and indication of the result of the comparison.

An embodiment has been designed for use in the recording and reproduction of video signals and is arranged to identify a digital word representing the start of a block of data e. g. of a line of a video scan in order to synchronize subsequent equipment.

BRIEF DESCRIPTION OF THE DRAWING

In order that the present invention be more readily understood, an embodiment thereof will now be described with reference to the accompanying drawing, the single FIGURE of which shows:

a block diagram of apparatus for detecting a particular sequence of digits.

DETAILED DESCRIPTION

Referring to the drawing, serial digital information is fed to a clock generator circuit 10 which recovers clock pulse information from the digital information and produces clock pulses for clocking the information into a shift register 11 of sufficient capacity to store the word identifying the start of a line of a video scan. The serial digital information is also fed directly to the shift register 11 where it is stored and shifted in response to the clock pulses from the clock generator 10. In the present instance, the shift register has 16 locations each of which has two outputs, one being a true output and the other being an inverted output. The outputs from the shift register 11 are arranged to produce a pre-determined pattern of digits when the correct word is assembled and to produce from two programmable read only memories 12 and 13 a predetermined number when all the 16 locations are correctly filled.

This is achieved in the particular embodiment by feeding the outputs from the 16 locations of the shift register 11 through sixteen switches 14. The two outputs of one location are fed to two poles of one switch 14 in such a way that only one output can be transmitted through the switch to an input of the memories 12,13. The switches 14 are preferably digital switches in the form of logic gates to produce a succession of logic ones to the 8 bit addres of each of the memories 12 and 13 when the correct 16 bit word is inserted into the shift register 11. For the switch arrangement shown, the start word is:

0 0 0 1 1 0 1 1 1 0 0 1 0 0 1 0

The memories each produce a 4 bit output indicative of the number of correct signals fed through the switches 14 to their addresses. The corrected signals are selected to be ones but could equally be zeros. More Specifically, each of the memories will produce a binary output indicative of a number from 0 to 8.

The outputs from the memories 12 and 13 are added together by an adding circuit 15 and fed to inputs 6A of a comparator 16 where they are compared with a reference value fed to the comparator via inputs B. The reference value is indicative of an acceptable limit to the number of correct bits in the shift register 11. The reference may be the lower acceptable limit for the number of correct bits, as shown in the diagram. In this case if, for example, the limit is 14, an output is produced from the comparator 16 if the sum is greater than or equal to the reference. Thus a maximum of two incorrect bits in the shift register 11 will produce an output. Alternatively, the reference may be the upper limit for the number of errors e.g., 2 in which case an output is produced if the sum produces a number of errors less than or equal to the reference.

The output from the comparator is held by an output latch 17 for the duration of the clock pulse from the clock generator 10 and in this way latch 17 produces at its output a recognition pulse.

In the above description, it has been assumed that the memories produce which is linear with respect to their input, i.e., six correct inputs will produce the binary representation of six. This need not be the case, however, and in some cases a non linear relationship may be preferred. For example, it may be determined that if two adjacent locations in the shift register produce incorrect outputs then this is more detrimental than two spaced incorrect outputs in which case the memories can be programmed to produce an output which is representative of, say, 4 rather than 6 as would otherwise be the case.

It is preferred to inhibit the apparatus described above until just before a start word should appear. This is best achieved by feeding an inhibiting signal to the latch 17. For regularly spaced start words, the inhibiting signal may be produced by a timer which thus switches the apparatus off for a predetermined period of time after a start word has been recognized. It is sometimes advantageous to precede the start word by a preamble of say, alternate ones and zeros to ensure a good clock recovery component and to be unlike a start word.

The apparatus has been described above as recognizing a single start word per line but it can also be used to identify a further reference word or words which can be inserted in between words representing locations along a line of a video scan or during the field blanking. Thus, the mid-line can also be recognised. This can be achieved by altering the switches to represent another pattern producing a succession of ones when the correct 16 bits are in the shift register 11. Alternatively, there need not be a start word every line, all that is required is that blocks of data are broken up occasionally by a start word. However, it is preferred to use at least one start word for every line of video.

The embodiment is of general application in digital recording or transmission and can be used for audio as well as video signals. It is however of particular application for colour T.V. video signals.

What I claim is:

1. Apparatus for detecting a predetermined sequence of binary digits, comprising
   (a) storage means (11) adapted to receive a succession of binary digits, said storage means including a plurality of sections each having an output;
   (b) recognition means including at least one programmable memory device (12,13) having inputs connected with the outputs of the storage means sections, said memory device having predetermined data stored therein and being operable to produce a numerical output signal indicative of the number of correct digits stored by said storage means;
   (c) means for supplying a reference signal; and
   (d) comparison means (16) for comparing said numerical output signal with said reference signal and for producing an indication of the result of the comparison.

2. Apparatus as defined in claim 1, wherein a plurality of memories are provided, said storage means comprising a shift register having a plurality of outputs a first group of which are connected with the inputs of a first memory, a second group of outputs being connected with a second memory, and further including adding means (15) connected with the outputs of said memories for producing said output signal.

3. Apparatus as defined in claim 2, and further including digital switch means (14) connected between said storage means and said recognition means.

* * * * *